United States Patent Office 3,403,530
Patented Oct. 1, 1968

3,403,530
LIQUID CARBON DIOXIDE REFRIGERATION
Vincent Guiffre, Ramsgate, New South Wales, Australia, assignor to The Colonial Sugar Refining Company Limited, Sydney, New South Wales, Australia, a company of Australia
Filed Oct. 10, 1966, Ser. No. 585,514
Claims priority, application Australia, Oct. 21, 1965, 65,591/65
7 Claims. (Cl. 62—303)

ABSTRACT OF THE DISCLOSURE

Apparatus for refrigerating a chamber by spray-cooling it with liquid carbon dioxide derived from a source maintained at a pressure not appreciably greater than the triple point pressure (for example at a pressure of 100 p.s.i.g.) but in which the risk of precipitated Dry Ice blocking the supply system has been eliminated, this improvement being achieved by linking the supply system at least at the end of each refrigerant discharge cycle to a reservoir containing an auxiliary gas at a pressure sufficient to flush residual liquid carbon dioxide and particles of precipitated Dry Ice through the discharge orifice(s) of the spray-cooling system.

---

Figure 1:
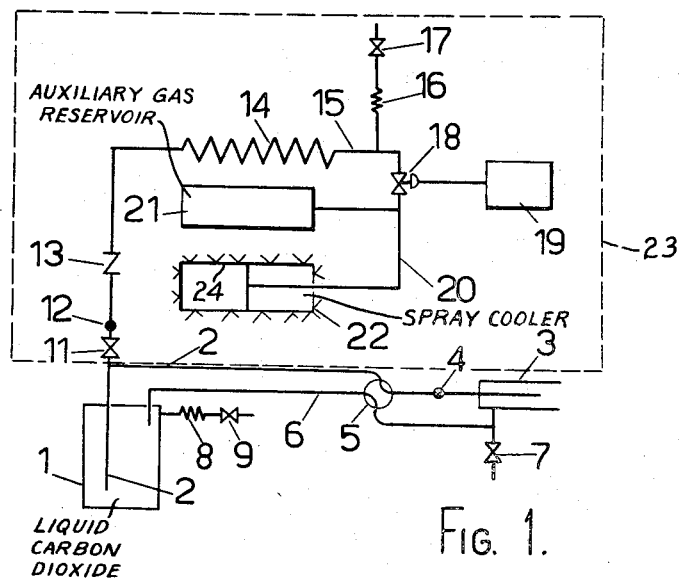

This invention relates to apparatus for refrigerating a chamber to a desired low temperature by injecting as required refrigerant carbon dioxide into the chamber.

When liquid and vapour phases co-exist in equilibrium, high pressures are inherently associated with high temperatures. In the case of liquid carbon dioxide in equilibrium with its vapour, a pressure of about 300 p.s.i.g. is associated with a temperature of about 0° F., while a presure of about 100 p.s.i.g. is associated with a temperature of about —50° F. It follows therefore that carbon dioxide has greater refrigerating capacity when maintained under the latter pressure conditions than when maintained under the former pressure conditions.

It is a disadvantage however, that carbon dioxide has a triple point (co-existing solid, liquid and vapour phases) at a pressure of about 60 p.s.i.g., corresponding to a temperature of about —70° F. For this reason, liquid carbon dioxide is susceptible to Dry Ice formation unless maintained at pressures in excess of the quoted (triple point) pressure.

When liquid carbon dioxide is used as a refrigerant for intermittently discharging into a chamber, and when the supply of refrigerant is controlled by a valve separated from the discharge orifice, care must be taken to avoid blockage of the supply pipe by the precipitation therein of Dry Ice between valve and orifice. It has therefore been usual in spray-cooling applications to maintain liquid carbon dioxide at relatively high pressures, for example greater than 250 p.s.i.g.

As explained above however, this practice has the disadvantage that the refrigerant capacity per unit mass of carbon dioxide—at, say pressures equal to or in excess of 250 p.s.i.g.—is relatively low, hence the required quantity of refrigerant must be proportionately high. An additional disadvantage, flowing from the latter requirement and from the high pressures which must be applied, is that the liquid must be stored in heavy, pressure-resistant vessels. Not only are such vessels expensive, but their weight creates special problems when the chambers are mobile (as in refrigerated rail and road vehicles).

It is an object of the present invention to provide means for enabling refrigerant carbon dioxide to be maintained at a pressure not appreciably greater than the triple point pressure and to be discharged as required from an orifice without risk of precipitated Dry Ice blocking the supply system. As explained hereinafter this is achieved by linking the supply system—at least at the end of each refrigerant discharge cycle—to a source of auxiliary gas at a pressure sufficient to flush residual liquid carbon dioxide and particles of precipitated Dry Ice through the orifice.

Broadly, the invention provides apparatus for refrigerating a chamber to a desired low temperature by injecting as required refrigerant carbon dioxide into said chamber; said apparatus comprising:

(a) a storage vessel adapted to contain liquid carbon dioxide at a pressure greater than the triple point pressure thereof;
(b) spray-cooling refrigeration means comprising one or more discharge orifices adapted for insertion in said chamber;
(c) first connecting means for effecting intermittent first communication between said storage vessel and said spray-cooling means; said first connecting means comprising: first pipe means connected to said storage vessel, second pipe means connected to said spray-cooling means, and a valve therebetween for controlling said intermittent first communication;
(d) a reservoir adapted to contain an auxiliary gas under pressure;
(e) means for supplying said auxiliary gas under pressure to said reservoir;
(f) second connecting means for effecting second communication between said reservoir and said second pipe means intermediate the length thereof; said second connecting means being adapted to effect said second communication at least when said first communication is interrupted by closure of said valve;

the volume of said reservoir and the pressure of said auxiliary gas being seelcted interdependently in such a way that said reservoir and said second connecting means together constitute flushing means for ejecting residual liquid carbon dioxide and particles of precipitated Dry Ice through said one or more discharge orifices during an interruption to said first communication.

Preferably the pressure of the refrigerant carbon dioxide is selected within the range 80 to 120 p.s.i.g.

As applied to the refrigeration of storage chambers, it has been found desirable (as hereinafter explained) for the first pipe means to incorporate vapourizing means. Preferably, such vapourizing means can consist of a heat exchanger housed within the storage chamber. If the selected heat exchanger provides a sufficiently great surface area it will be appreciated that refrigeration can be attributed primarily to this means and only secondarily to the spray-cooling means.

Figure 2:
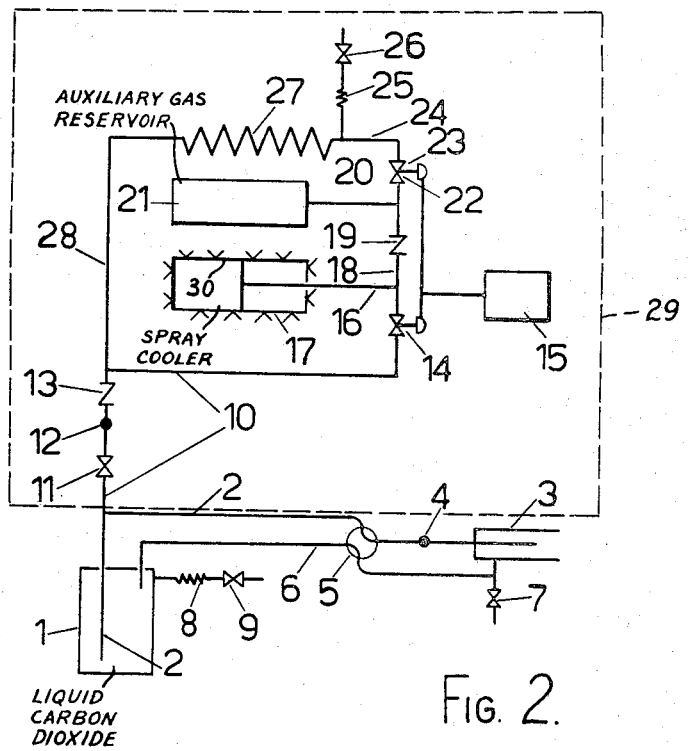

The invention is now described fore fully in relation to FIGURES 1 and 2 of the annexed drawings.

FIGURE 1 shows schematically a refrigeration system designed for installation in association with a refrigerated chamber 23 in a railway carriage (not shown) and illustrates a preferred embodiment of the invention in which (i) heat exchanger vapourizing means is included in the described first pipe means, and (ii) the described second pipe means communicates continuously with the described reservoir.

The system consists of a combination of parts including: a refrigerant supply vessel 1 for storing liquid carbon dioxide, connected to spray-cooling means 22 by first pipe means comprising pipe lines 10, 15 and heat exchanger 14, and second pipe means comprising pipe line 20. This second pipe means communicates continuously with gas reservoir 21. Communication between the refrigerant supply vessel and the spray-cooling means is intermittent and is controlled by diaphragm-operated valve 18.

Other parts included in the system are discussed below in relation to various operational aspects.

Refrigerant supply

Liquid carbon dioxide, at a pressure of about 100 p.s.i.g. and a temperature of about −50° F., is supplied to vacuum insulated vessel 1 from liquid filling line 2 coupled to the inner pipe of a twin concentric feeding hose 3. The liquid is passed through strainer 4 and the supply is controlled by manually operated valve 5.

Gas displaced from the vessel is returned by gas line 6 to the manually operated valve 5 and thence to the annular space between the inner and outer pipes of the feeding hose. When the filling operation is completed, liquid carbon dioxide begins to return by the gas line to the feeding hose, and the manually operated valve 5 is then shut. Confirmation that this stage has been reached is obtained readily by opening try-cock 7 and testing for the presence therein of liquid carbon dioxide.

During those periods when refrigeration is not required in the storage chamber, excessive pressures are liable to be generated in the refrigerant supply system. To allow for this possibility, the gas-containing section of vessel 1 is attached via heating coil 8 to a bleed valve 9 designed to open at pressures exceeding, say, 105 p.s.i.g.

Communication between the refrigerant supply vessel and the heat exchanger occurs via ball valve 11, strainer 12 and non-return valve 13 in pipe line 10.

When refrigeration is not required in the storage chamber, the diaphragm-operated valve is closed and any liquid carbon dioxide which may be present in the heat exchanger is vapourized therein and accumulates as gaseous carbon dioxide at a pressure of about 100 p.s.i.g.

In the absence of the described heat exchanger, carbon dioxide would be liable to accumulate as a liquid in the first pipe means on the upstream side of the diaphragm-operated valve. On opening the valve, Dry Ice would then tend to be precipitated across the valve seat, thereby blocking the refrigerant supply system. The provision of a heat exchanger ensures the presence of gaseous carbon dioxide on the upstream side of the closed valve, thus preventing such possible Dry Ice precipitation.

The diaphragm-operated valve is adapted to be opened or closed by transmission of an appropriate pressure signal to its diaphragm. Means 19 for transmitting pressure signals to the diaphragm can be operated automatically or manually to effect a desired degree of cooling in the storage chamber. A preferred automatically operated system is described in my United States patent application No. 572,755 filed Aug. 16, 1966.

Refrigerant discharge

When the diaphragm-operated valve is opened, gaseous carbon dioxide is released into the second pipe means and its associated reservoir and is discharged through the discharge orifices 24 of the spray-cooling means.

If the heat exchanger is comparatively small and if the diaphragm-operated valve is maintained in open position for a prolonged period, the proportion of gaseous carbon dioxide filling the heat exchanger gradually diminishes and its place is taken by liquid carbon dioxide. Eventually, liquid carbon dioxide is discharged through the orifices of the spray-cooling means, but the reservoir remains substantially charged with gaseous carbon dioxide.

In the illustrated embodiment, the spray-cooling means consists of a looped arrangement including appropriate orifices throughout its length, and carbon dioxide is distributed from a centrally located pipe to opposed segments of the loop. By adopting this arrangement there is a much diminished possibility of refrigeration being disrupted by the occurrence of random orifice blockages.

During periods of refrigeration, excessive pressures are liable to be generated from time to time in the heat exchanger refrigeration system, and for this reason, pipe line 15 is attached via heating coil 16 to a relief valve 17 designed to open at pressures exceeding, say 120 p.s.i.g.

Termination of discharge

When the diaphragm-operated valve is closed at the end of a discharge phase, the pressure in the second pipe means begins to fall and there is an increased likelihood of Dry Ice being precipitated therein. In the absence of the described communicating reservoir of carbon dioxide, it would therefore be expected that extensive orifice blockages would occur at this stage.

It has been ascertained however that the presence of this reservoir provides a source of auxiliary gas at a pressure sufficient to flush residual liquid carbon dioxide and particles of precipitated Dry Ice through the orifices, in consequence of which, blockages do not occur.

It will be appreciated that the reservoir has a critical minimum volume which must be exceeded to enable satisfactory operation under a given set of conditions. This critical volume can readily be determined by trial and error. In the case of a refrigerated rail vehicle it has been found convenient to use a reservoir having a volume of the order of 1 cubic foot.

In normal circumstances, refrigeration requirements entail repeated opening and closing of the diaphragm-operated valve. This results in a corresponding repetition of the above cycle of events until the desired period of refrigeration is completed.

FIGURE 2 shows schematically an alternative refrigeration system designed for installation in association with a refrigerated chamber 29 in a railway carriage (not shown), and illustrates another embodiment of the invention in which (i) heat exchanger vapourizing means is not included in the described first pipe means, and (ii) the described second pipe means communicates intermittently with the described reservoir.

The system consists of a combination of parts, some of which have already been described in relation to FIGURE 1. The following description is abridged accordingly in those common aspects which have already been discussed.

The refrigerant supply vessel 1 is linked to spray-cooling means 17 by first pipe means comprising pipe line 10 and second pipe means comprising pipe line 16. This second pipe means communicates intermittently with gas reservoir 21 via non-return valve 19 in arm 18 of a T-piece 18, 20, 22. Non-return valve 19 is selected to open towards pipe line 16 at a differential pressure of 10 p.s.i.g. Communication between the refrigerant supply vessel and the spray-cooling means is intermittent and controlled by diaphragm-operated valve 14.

The gas reservoir is also linked to the refrigerant supply vessel by third pipe means comprising arm 22 of the described T-piece, pipe lines 24, 28 and heat exchanger 27. Communication between arm 22 and pipe line 24 is intermittent and controlled by diaphragm-operated valve 23. In order to prevent the generation of excessive pressures in the heat exchanger and associated pipe lines, pipe line 24 is attached via heating coil 25 to a relief valve 26 described to open at pressures exceeding, say, 120 p.s.i.g.

Refrigerant discharge

When refrigeration is not required in the storage chamber, the diaphragm-operated valves 14 and 23 are both closed. Carbon dioxide is present essentially as a liquid at a pressure of about 100 p.s.i.g. on the upstream side of diaphragm-operated valve 14, and any liquid carbon dioxide which may be present in the heat exchanger is vapourized therein and accumulates as a gas at a pressure of about 100 p.s.i.g. on the upstream side of diaphragm-operated valve 23.

The diaphragms of the diaphragm-operated valves are both linked to means 15 for transmitting pressure signals thereto and the two valves are adapted to open and close in unison. As indicated in relation to FIGURE 1, such means can be operated automatically or manually to effect a desired degree of cooling in the storage chamber.

When the diaphragm-operated valves are opened, carbon dioxide essentially as a liquid is released via valve 14 into pipe line 16, and gaseous carbon dioxide is released via valve 23 into the T-piece and associated gas reservoir 21.

Should the pressure in pipe line 16 be even momentarily less than about 90 p.s.i.g., gaseous carbon dioxide will immediately flow through the described non-return valve to build up the pressure therein to this valve. By this provision it is ensured that liquid carbon dioxide passing from diaphragm-operated valve 14 towards the spray-cooling means does not enter a region where the prevailing pressure is less than the triple point pressure. Blockage hazards due to precipitated Dry Ice are thus reduced at the onset of the refrigerant discharge phase.

As soon as the pressure has been built up in the spray-cooling system to greater than about 90 p.s.i.g., gaseous carbon dioxide can no longer flow through the non-return valve. In this embodiment of the invention there is therefore no sustained passage of vapourizing carbon dioxide through the heat exchanger, and the refrigeration effect is attributable almost wholly to spray-cooling.

Termination of discharge

When the diaphragm-operated valves are closed at the end of a discharge phase, the pressure in pipe line 16 begins to fall. However, as the pressure becomes less than about 90 p.s.i.g., gaseous carbon dioxide immediately flows from the reservoir through the non-return valve. This reservoir is a source of auxiliary gas which (in the manner previously explained) serves to expel residual liquid carbon dioxide and particles of precipitated Dry Ice through the discharge orifice 30 of the spray-cooling means.

While the invention has been described in relation only to the refrigeration of storage chambers, it will be appreciated that it may be employed in relation to the refrigeration of a wide variety of hollow receptacles, ranging from flasks to so-called "environmental" chambers.

We claim:
1. Apparatus for refrigerating a chamber to a desired low temperature by injecting as required refrigerant carbon dioxide into said chamber; said apparatus comprising:
   (a) a storage vessel adapted to contain liquid carbon dioxide at a pressure greater than the triple point pressure thereof;
   (b) spray-cooling refrigeration means comprising one or more discharge orifices adapted for insertion in said chamber;
   (c) first connecting means for effecting intermittent first communication between said storage vessel and said spray-cooling means; said first connecting means comprising: first pipe means connected to said storage vessel, second pipe means connected to said spray-cooling means, and a valve therebetween for controlling said intermittent first communication;
   (d) a reservoir adapted to contain an auxiliary gas under pressure;
   (e) means for supplying said auxiliary gas under pressure to said reservoir;
   (f) second connecting means for effecting second communication between said reservoir and said second pipe means intermediate the length thereof; said second connecting means being adapted to effect said second communication at least when said first communication is interrupted by closure of said valve;
the volume of said reservoir and the pressure of said auxiliary gas being selected interdependently in such a way that said reservoir and said second connecting means together constitute flushing means for ejecting residual liquid carbon dioxide and particles of precipitated Dry Ice through said one or more discharge orifices during an interruption to said first communication.

2. Apparatus according to claim 1, wherein said storage vessel is adapted to contain liquid carbon dioxide at a pressure selected within the range 80 to 120 p.s.i.g.

3. Apparatus according to claim 2, wherein said storage vessel is adapted to contain liquid carbon dioxide at a pressure of 100 p.s.i.g.

4. Apparatus according to claim 1, wherein said first pipe means incorporates vapourizing means.

5. Apparatus according to claim 4, wherein said vapourizing means consists of a heat exchanger adapted to be housed within said chamber.

6. Apparatus according to claim 1, wherein said means for supplying auxiliary gas under pressure to said reservoir comprises means for effecting communication between said reservoir and said storage vessel.

7. Apparatus according to claim 1, wherein said second connecting means is adapted to effect said second communication continuously.

References Cited
UNITED STATES PATENTS

| | | | |
|---|---|---|---|
| 3,214,928 | 11/1965 | Oberdorfer | 62—64 X |
| 3,258,931 | 7/1966 | Kelley et al. | 62—64 |
| 3,274,789 | 9/1966 | Mitchell | 62—402 X |

ROBERT A. O'LEARY, *Primary Examiner.*

W. E. WAYNER, *Assistant Examiner.*